United States Patent
Kozawa et al.

(10) Patent No.: US 8,427,029 B2
(45) Date of Patent: Apr. 23, 2013

(54) ROTOR SHAFT

(75) Inventors: Yuji Kozawa, Aichi (JP); Tatsuhiko Mizutani, Aichi (JP); Hiroki Kato, Aichi (JP); Takahisa Yashiro, Aichi (JP)

(73) Assignees: OTICS Corporation, Nishio (JP); Toyota Jidosha Kabushiki Kaisha, Toyota-shi (JP)

( * ) Notice: Subject to any disclaimer, the term of this patent is extended or adjusted under 35 U.S.C. 154(b) by 284 days.

(21) Appl. No.: 12/872,493

(22) Filed: Aug. 31, 2010

(65) Prior Publication Data

US 2011/0050030 A1 Mar. 3, 2011

(30) Foreign Application Priority Data

Aug. 31, 2009 (JP) ................. 2009-200407

(51) Int. Cl.
*H02K 1/22* (2006.01)
(52) U.S. Cl.
USPC ...................................... 310/261.1
(58) Field of Classification Search ........... 310/261.1
See application file for complete search history.

(56) References Cited

U.S. PATENT DOCUMENTS

| 5,439,300 | A | 8/1995 | Hirakawa et al. | |
|---|---|---|---|---|
| 2006/0158060 | A1* | 7/2006 | Ishikawa et al. | 310/261 |
| 2007/0205683 | A1* | 9/2007 | Kawamura et al. | 310/114 |
| 2008/0122303 | A1* | 5/2008 | Santo et al. | 310/51 |
| 2009/0115263 | A1* | 5/2009 | Ihara et al. | 310/42 |

FOREIGN PATENT DOCUMENTS

| DE | 102 26 572 A1 | 1/2004 |
|---|---|---|
| DE | 102 26 572 A1 | 11/2004 |
| GB | 2 275 509 A | 8/1994 |
| JP | 2004-222347 | 8/2004 |
| JP | 2007-166863 | 6/2007 |
| JP | 2007-312576 | 11/2007 |

OTHER PUBLICATIONS

Chinese Office Action issued Jul. 4, 2012 in Patent Application No. 201010269328.5 with English Translation.
Extended European Search Report issued Feb. 17, 2012, in European Patent Application No. 10174507.3.

* cited by examiner

*Primary Examiner* — Tran Nguyen
(74) *Attorney, Agent, or Firm* — Oblon, Spivak, McClelland, Maier & Neustadt, L.L.P.

(57) ABSTRACT

It is an object of the present invention to provide a rotor shaft capable of sufficiently securing a fastening strength between an inner shaft and an outer shaft, obtaining an excellent anti-rotation torque, and reducing a weight of the rotor shaft. A rotor shaft is divided into an inner shaft and an outer shaft. The inner shaft includes a tip end portion, a rear end portion, and a thick portion. The thick portion connects the tip end portion 41 and the rear end portion with each other in the radial direction, and has the same inner diameter as that of the tip end portion and the same outer diameter as that of the rear end portion. The outer shaft includes an inner cylindrical portion, a magnetic body-mounting outer cylindrical portion, and a flange that connects the inner cylindrical portion and the magnetic body-mounting outer cylindrical portion with each other. Outer peripheral surfaces and of the thick portion and the rear end portion and an inner peripheral surface of the inserting hole of the inner cylindrical portion are brought into contact with each other, and the inner shaft and the outer shaft are fastened and fixed to each other. The flange is disposed at a position opposed to the thick portion in the radial direction.

7 Claims, 6 Drawing Sheets

ROTOR SHAFT

CROSS-REFERENCES TO RELATED APPLICATIONS

The present application claims priority under 35 U.S.C. §119 to Japanese Application No. 2009-200407, filed Aug. 31, 2009, entitled "ROTOR SHAFT". The contents of this application are incorporated herein by reference in their entirety.

BACKGROUND OF THE INVENTION

1. Field of the Invention

The present invention relates to a rotor shaft used for a rotor of a dynamo-electric machine.

2. Description of the Related Art

In a dynamo-electric machine such as a motor, a generator and a motor generator used for a hybrid vehicle, an electric vehicle and the like, a rotor having a magnetic body is rotatably disposed on an inner peripheral side portion of a stator having a field winding. The rotor includes a rotor shaft and the magnetic body mounted on the rotor shaft.

As shown in FIG. 6, a rotor shaft 93 is formed by connecting an inner peripheral side portion 931 and an outer peripheral side portion 933 with each other through a flange 932, and the rotor shaft 93 is integrally formed by forging or the like.

However, if the product is increased in size, it becomes difficult to form the product integrally using the above method. Hence, if the rotor shaft is divided radially into an inner shaft and an outer shaft, the rotor shaft can be produced easily. In Japanese Patent Application Laid-open No. 2007-166863 for example, the inner shaft is shrink-fitted into the outer shaft, and both the shafts are fastened to each other to form the rotor shaft.

When the divided structure is employed as described above, however, it has been a problem at which position the rotor shaft is divided. In the case where the dividing position is not appropriate, a fastening strength between the inner shaft and the outer shaft is not sufficiently secured, and if a large torque is applied to the rotor shaft in its rotating direction (circumferential direction), the fastened state between the inner shaft and the outer shaft is loosened in some cases.

For this reason, it is desired to realize a rotor shaft of the divided structure having such a sufficient fastening strength that can withstand a large rotation torque, and a dividing position for realizing the rotor shaft has been studied.

SUMMARY OF THE INVENTION

The present invention has been accomplished in view of the conventional problem, and the invention provides a rotor shaft capable of sufficiently securing the fastening strength between the inner shaft and the outer shaft, obtaining the excellent anti-rotation torque, and reducing a weight of the rotor shaft.

The present invention provides a rotor shaft used for a rotor of a dynamo-electric machine, wherein the rotor shaft is configured to be divided into a cylindrical inner shaft and an outer shaft disposed on an outer periphery of the inner shaft, the inner shaft includes a tip end portion that is an end on a side where a rotation load is input to the rotor shaft, a rear end portion having an outer diameter greater than that of the tip end portion, and a thick portion that connects the tip end portion and the rear end portion with each other and that has the same inner diameter as that of the tip end portion and has the same outer diameter as that of the rear end portion, the outer shaft includes an inner cylindrical portion having an inserting hole into which the inner shaft is inserted and fitted, a magnetic body-mounting outer cylindrical portion that is disposed on an outer peripheral side portion of the inner cylindrical portion and that mounts a magnetic body to form a magnetic circuit, and a flange that is formed radially outward from an outer periphery of the inner cylindrical portion and that connects the inner cylindrical portion and the magnetic body-mounting outer cylindrical portion with each other, outer peripheral surfaces of the thick portion and the rear end portion and an inner peripheral surface of the inserting hole of the inner cylindrical portion are brought into contact with each other, and the inner shaft and the outer shaft are fastened and fixed to each other by mutual pressing forces, and the flange of the outer shaft is disposed at a position opposed to the thick portion of the inner shaft in a radial direction thereof.

The rotor shaft of the invention includes the inner shaft having the tip end portion portion, the thick portion and the rear end portion, and the outer shaft having the inner cylindrical portion, the flange and the magnetic body-mounting outer cylindrical portion. The inner shaft and the rotor shaft are fastened and fixed to each other by mutual pressing forces in a state that the outer peripheral surfaces of the thick portion and the rear end portion and the inner peripheral surface of the inserting hole of the inner cylindrical portion are brought into contact with each other.

That is, it can be conceived that the inner shaft and the outer shaft of the rotor shaft are radially divided from each other from their contact surfaces as dividing surfaces. According to this configuration, the rotor shaft can be divided at a position close to its center as close as possible, and the outer peripheral surfaces of the thick portion and the rear end portion of the inner shaft can function as surfaces that come into contact with the outer shaft (see FIGS. 2 and 3A of a later-described embodiment).

Hence, a length of a fastened portion between the inner shaft and the outer shaft in the axial direction, i.e., an area of the entire fastened portion can sufficiently be secured as compared with a case where the rotor shaft is divided at a position different from that described above (see FIGS. 3B to 3D of a later-described embodiment). According to this configuration, a fastening strength between the inner shaft and the outer shaft in the axial direction and the circumferential direction can sufficiently be secured, and an excellent anti-rotation torque can be obtained.

The flange of the outer shaft is disposed at a position opposed to the thick portion of the inner shaft in the radial direction. Here, the flange has a high rigidity in the radial direction as compared with a portion of the outer shaft where the flange does not exist. The thick portion has a high rigidity in the radial direction as compared with other portion of the inner shaft. That is, in the invention, the flange having the high rigidity is disposed outside of the thick portion having the high rigidity. Therefore, the fastening strength between the inner shaft and the outer shaft in the axial direction and the circumferential direction can be enhanced, and the anti-rotation torque can further be enhanced.

Even if the length of the flange in its axial direction is shortened as compared with the conventional technique (see the above-mentioned FIG. 6) in order to reduce the weight (see FIG. 2 of the later-described embodiment) outside of the thick portion having the high rigidity, the fastening strength between the inner shaft and the outer shaft and the anti-rotation torque can sufficiently be secured by disposing the flange having the high rigidity. This configuration can reduce the weight of the entire rotor shaft.

According to the invention, it is possible to provide the rotor shaft capable of sufficiently securing the fastening strength between the inner shaft and the outer shaft, obtaining the excellent anti-rotation torque, and reducing the weight of the rotor shaft.

DESCRIPTION OF THE PREFERRED EMBODIMENTS

Figure 1:
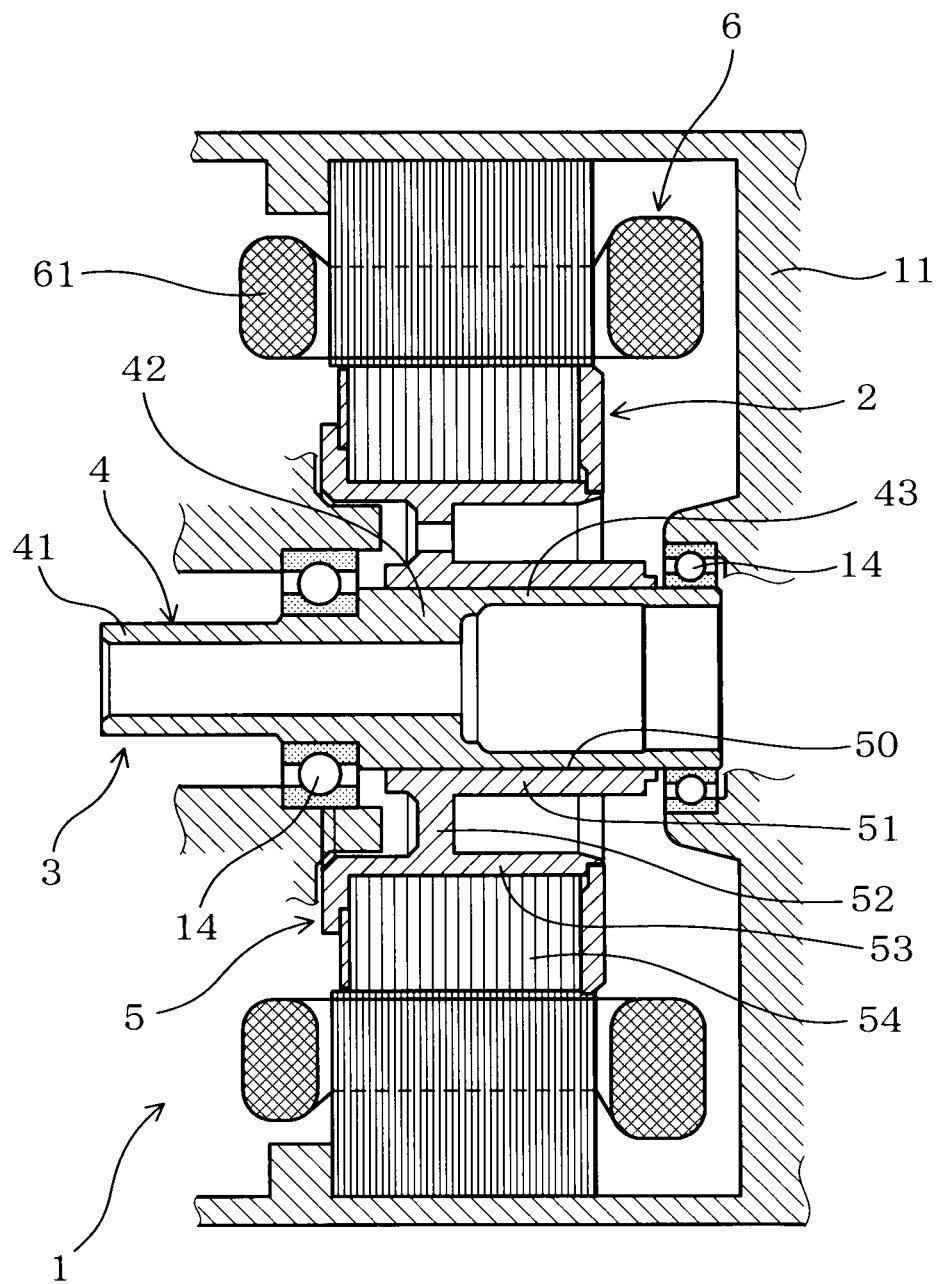
FIG. 1 is an explanatory diagram showing a state where a rotor using a rotor shaft is disposed in a dynamo-electric machine according to a first embodiment.

In the present invention, the rotor shaft can be employed in a motor, a generator, a motor generator and the like provided in a hybrid vehicle, an electric vehicle and the like.

For example, an input from an internal combustion engine (engine) is transmitted to the rotor shaft at the time of acceleration, and an inertial mass of electromagnetic steel plates connected to the rotor shaft act to rotate the rotor shaft, whereby a rotation load is input to the rotor shaft. A side where the rotation load is input to the above-described rotor shaft means a side on which the rotation load is input.

It is preferable that 85% or more of a length of the flange in its axial direction is opposed to the thick portion in the radial direction.

If the length of the flange in the axial direction opposed to the thick portion in the radial direction is less than 85%, an effect for enhancing the fastening strength between the inner shaft and the outer shaft may not sufficiently be exhibited.

It is preferable that the inner shaft is shrink-fitted into the inserting hole of the inner cylindrical portion of the outer shaft.

In this case, the inner shaft and the outer shaft can easily be fastened to each other. By employing the above configuration of the invention, even if the inner shaft and the outer shaft are fastened to each other by shrink-fitting, the fastening strength can sufficiently be secured.

The shrink-fitting can be carried out in the following manner. That is, first, an inner diameter of the inserting hole of the inner cylindrical portion of the outer shaft is formed smaller than an outer diameter of the inner shaft. After the inner cylindrical portion is heated and expanded, the inner shaft is inserted into the inserting hole of the inner cylindrical portion. Thereafter, the inner cylindrical portion is cooled and shrunk, and the inner shaft is fastened into the inserting hole of the inner cylindrical portion of the outer shaft.

The inner shaft and the outer shaft can be fastened to each other using a technique other than the shrink-fitting.

It is preferable that asperities are formed on at least a portion of a contact surface of the outer peripheral surface of the thick portion with respect to the inner peripheral surface of the inserting hole of the inner cylindrical portion.

In this case, the inner peripheral surface of the inserting hole of the inner cylindrical portion of the outer shaft comes into contact with and bites into the asperities of the outer peripheral surface of the thick portion of the inner shaft, whereby the fastening strength between the inner shaft and the outer shaft can further be enhanced.

Especially when the inner shaft and the outer shaft are fastened to each other by the shrink-fitting, the above effect can further be exhibited.

It is preferable that the asperities are formed on a portion of the contact surface of the outer peripheral surface of the thick portion where at least the thick portion and the flange are opposed to each other in the radial direction.

In this case, it is possible to further enhance the fastening strength in a portion where the fastening strength between the inner shaft and the outer shaft is enhanced by disposing the flange outside of the thick portion having the high rigidity. This can more effectively enhance the fastening strength between the inner shaft and the outer shaft.

The asperities of the contact surface in the outer peripheral surface of the thick portion can be formed by knurling. The shape of the asperities can be of twill pattern. The asperities can of course be formed using other machining method, and the asperities may have other shapes.

When the inner shaft and the outer shaft are fastened to each other by the shrink-fitting, it is preferable that the height of the asperities is half or less of the shrink-fitting margin because the fastening strength between the inner shaft and the outer shaft can sufficiently be obtained.

It is preferable that the inner shaft is made of material that is subjected to carburizing processing or carbonitriding processing, and the outer shaft is made of carbon steel for machine structure or chromium steel.

In this case, by selecting the materials of the inner shaft and the outer shaft as described above, it is possible to further exhibit the effect that the fastening strength between the inner shaft and the outer shaft can sufficiently be secured, and the excellent anti-rotation torque can be obtained.

Examples of materials for the inner shaft, that are subjected to carburizing processing or carbonitriding processing are S15C, S20C, S30C, SCr415 and SCr420.

Examples of carbon steel for machine structure or chromium steel constituting the outer shaft are S15C, S20C, S30C, S35C, S40C, S45C, S50C, S55C, S600, SCr415 and SCr420.

First Embodiment

A rotor shaft according to an embodiment of the invention will be described using the drawings.

As shown in FIG. 1, the rotor shaft 3 of the embodiment is used for a rotor 2 of a dynamo-electric machine 1, and is divided into a cylindrical inner shaft 4 and an outer shaft 5 disposed on an outer periphery of the inner shaft 4.

Figure 2:
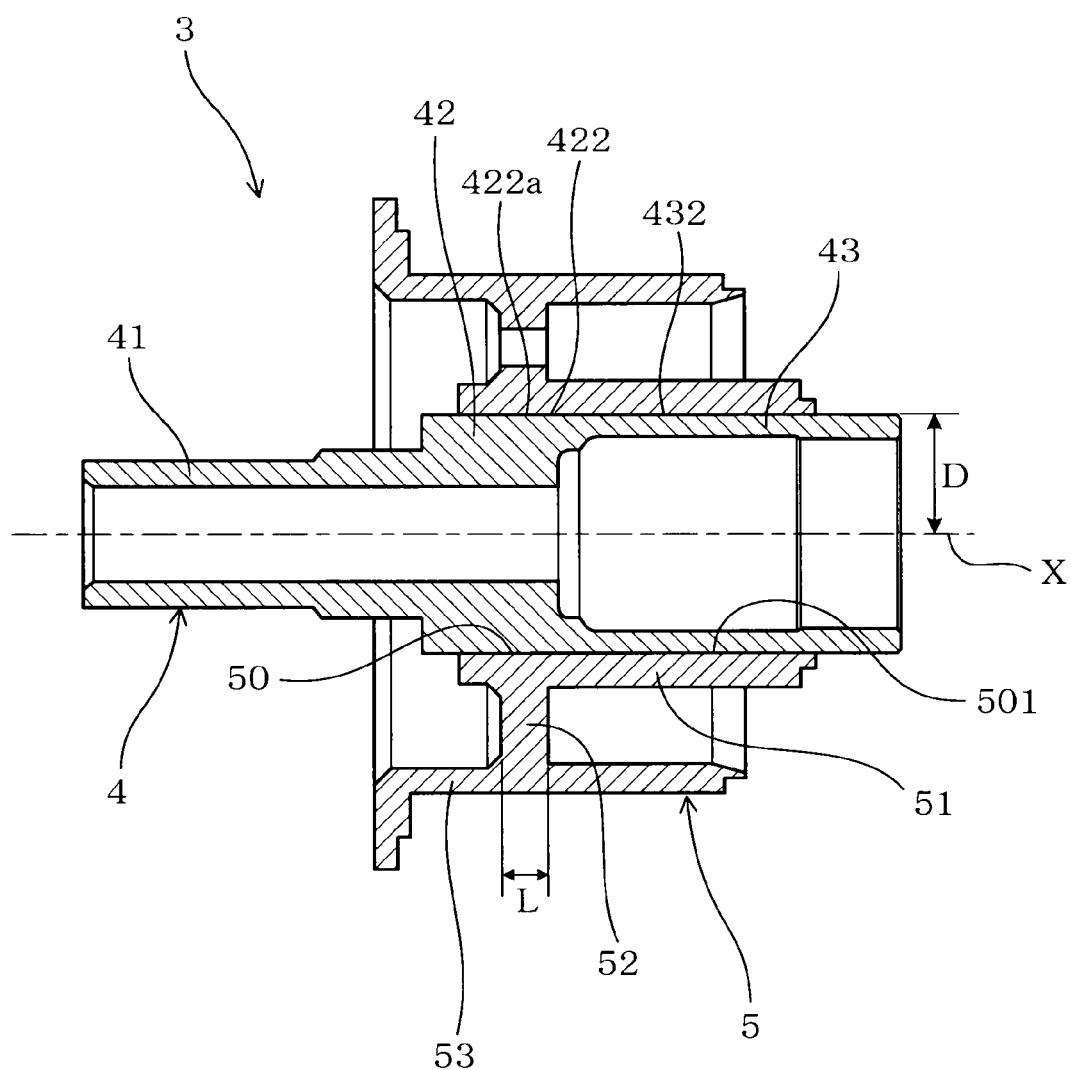
FIG. 2 is an explanatory diagram showing the rotor shaft in which an inner shaft and an outer shaft are fastened to each other in the first embodiment.

As shown in FIGS. 1 and 2, the inner shaft 4 includes a tip end portion 41 that is an end on a side where a rotation load is input to the rotor shaft 3, a rear end portion 43 having an outer diameter greater than that of the tip end portion 41, and a thick portion 42 that connects the tip end portion 41 and the rear end portion 43 in the radial direction. The thick portion 42 has the same inner diameter as that of the tip end portion 41, and has the same outer diameter as that of the rear end portion 43.

As shown in the drawings, the outer shaft 5 includes an inner cylindrical portion 51 having an inserting hole 50 into which the inner shaft 4 is inserted and fitted, a magnetic body-mounting outer cylindrical portion 53 disposed on the outer peripheral side portion of the inner cylindrical portion 51 for mounting a magnetic body 54 that forms a magnetic circuit, and a flange 52 formed radially outward from the outer periphery of the inner cylindrical portion 51 and connecting the inner cylindrical portion 51 and the magnetic body-mounting outer cylindrical portion 53 with each other.

As shown in the drawings, the inner shaft 4 and the outer shaft 5 are fastened and fixed to each other by mutual pressing forces in a state that outer peripheral surfaces 422 and 432 of the thick portion 42 and the rear end portion 43 and an inner peripheral surface 501 of the inserting hole 50 of the inner cylindrical portion 51 are brought into contact with each other. The flange 52 of the outer shaft 5 is disposed at a position opposed to the thick portion 42 of the inner shaft 4 in the radial direction.

This configuration will be described below.

The dynamo-electric machine 1 of the embodiment is provided in a hybrid vehicle, an electric vehicle and the like. The dynamo-electric machine 1 is a motor mainly used for a driving operation. The dynamo-electric machine 1 may be a generator mainly used for generating electricity, or a motor generator used both for generating electricity and for the driving operation.

As shown in FIGS. 1 and 2, the rotor shaft 3 is divided into the cylindrical inner shaft 4 and the outer shaft 5 disposed on the outer periphery of the inner shaft 4. As shown in FIG. 2, a dividing position thereof is a position separated from a center X of the rotor shaft 3 by a distance D.

As shown in FIG. 1, a cross section of the inner shaft 4 is of a cylindrical shape, and the inner shaft 4 is rotatably disposed in a housing 11 through bearings 14 provided on outer peripheral surfaces of both ends in the axial direction.

As shown in FIGS. 1 and 2, the inner shaft 4 includes the tip end portion 41, the thick portion 42 and the rear end portion 43. A thickness of the thick portion 42 is greater than those of the tip end portion 41 and the rear end portion 43. An outer diameter of the tip end portion 41 is smaller than those of the thick portion 42 and the rear end portion 43. The outer diameters of the thick portion 42 and the rear end portion 43 are substantially the same. The inner diameters of the tip end portion 41 and the thick portion 42 are substantially the same, and are smaller than that of the rear end portion 43.

As shown in the drawings, the outer shaft 5 includes the inner cylindrical portion 51, the flange 52 and the magnetic body-mounting outer cylindrical portion 53. The magnetic body-mounting outer cylindrical portion 53 has a circular cross section, and is provided on the side of the outer periphery of the flange 52 formed radially outwardly from the outer periphery of the inner cylindrical portion 51. The magnetic body 54 for forming the magnetic circuit in the dynamo-electric machine 1 is mounted on an outer peripheral surface of the magnetic body-mounting outer cylindrical portion 53.

The flange 52 of the outer shaft 5 is disposed at a position opposed to the thick portion 42 of the inner shaft 4 in the radial direction. In this embodiment, a region of the flange 52 not less than 85% of a length L thereof in the axial direction is opposed to the thick portion 42 in the radial direction as shown in FIG. 2.

As shown in FIG. 1, the rotor 2 is formed by fastening the inner shaft 4 and the outer shaft 5 to each other, and the magnetic body 54 is mounted on the rotor 2. The rotor 2 is disposed on the side of an inner periphery of a stator 6 fixed to the housing 11.

In the dynamo-electric machine 1, a magnetic circuit that rotates the rotor 2 or a magnetic circuit that generates electricity is formed by a field winding 61 disposed in the stator 6 and the magnetic body 54 disposed in the rotor 2.

In this embodiment, the inner shaft 4 is shrink-fitted into the inserting hole 50 of the inner cylindrical portion 51 of the outer shaft 5 as shown in FIG. 2. This shrink-fitting is carried out in the following manner. That is, first, an inner diameter of the inserting hole 50 of the inner cylindrical portion 51 of the outer shaft 5 is formed smaller than an outer diameter of the inner shaft 4. After the inner cylindrical portion 51 is heated and expanded, the inner shaft 4 is inserted into the inserting hole 50 of the inner cylindrical portion 51. Thereafter, the inner cylindrical portion 51 is cooled and shrunk, and the inner shaft 4 is fastened to the inserting hole 50 of the inner cylindrical portion 51 of the outer shaft 5.

That is, by cooling the heated and expanded inner cylindrical portion 51, the inserting hole 50 of the inner cylindrical portion 51 tries to restore to its original inner diameter. However, since the inner shaft 4 is inserted into the inserting hole 50, a force for fastening the inner shaft 4 is applied in the inner cylindrical portion 51. On the other hand, a force repelling this force is applied in the inner shaft 4. These forces are caused by a shrink-fitting margin that is a difference between the inner diameter of the inserting hole 50 of the inner cylindrical portion 51 and the outer diameter of the inner shaft 4.

By these forces, the inner shaft 4 and the outer shaft 5 are fastened and fixed to each other by the mutual pressing forces in a state that the outer peripheral surfaces 422 and 432 of the thick portion 42 and the rear end portion 43 of the inner shaft 4 and the inner peripheral surface 501 of the inserting hole 50 of the inner cylindrical portion 51 in the outer shaft 5 are brought into contact with each other.

In this embodiment, as shown in the drawings, asperities are formed on a portion of a contact surface 422a of the outer peripheral surface 422 of the thick portion 42 in the inner shaft 4 with respect to the inner peripheral surface 501 of the inserting hole 50 of the inner cylindrical portion 51 in the outer shaft 5. More specifically, asperities are formed on a part of the contact surface 422a of the outer peripheral surface 422 of the thick portion 42 where the thick portion 42 and the flange 52 are opposed to each other in the radial direction.

The inner shaft 4 and the outer shaft 5 are fastened and fixed to each other in a state where the inner peripheral surface 501 of the inserting hole 50 of the inner cylindrical portion 51 of the outer shaft 5 bites into the asperities of the outer peripheral surface 422 of the thick portion 42 of the inner shaft 4 at the time of the shrink-fitting.

The asperities of the contact surface 422a are formed by knurling. The shape of the asperities is of twill pattern. The height of the asperities is half or less of the shrink-fitting margin.

In this embodiment, SCr415 that is a material subjected to the carburizing processing is used as a material of the inner shaft 4. Further, S50C that is carbon steel for machine structure is used as a material of the outer shaft 5.

The inner shaft 4 and the outer shaft 5 are formed into desired shapes by a cutting operation.

Next, advantages and effects of the rotor shaft 3 of the embodiment will be described.

The rotor shaft 3 of the embodiment includes the inner shaft 4 having the tip end portion 41, the thick portion 42 and the rear end portion 43, and the outer shaft 5 having the inner cylindrical portion 51, the flange 52 and the magnetic body-mounting outer cylindrical portion 53. The inner shaft 4 and the outer shaft 5 are fastened and fixed to each other by the mutual pressing forces in a state that the outer peripheral surfaces 422 and 432 of the thick portion 42 and the rear end portion 43 and the inner peripheral surface 501 of the inserting hole 50 of the inner cylindrical portion 51 are brought into contact with each other.

That is, it can be considered that the inner shaft 4 and the outer shaft 5 of the rotor shaft 3 are radially divided from each other from their contact surfaces as dividing surfaces. According to this configuration, the rotor shaft 3 can be divided at a position close to its center as close as possible, and the outer peripheral surfaces 422 and 432 of the thick portion 42 and the rear end portion 43 of the inner shaft 4 can function as surfaces that come into contact with the outer shaft 5.

Therefore, a length of the fastened portion between the inner shaft 4 and the outer shaft 5 in the axial direction, i.e., an area of the entire fastened portion can sufficiently be secured as compared with a case where the rotor shaft 3 is divided at a position different from that described above (see FIGS. 3B to 3D of a later-described second embodiment). According to this configuration, the fastening strength between the inner shaft 4 and the outer shaft 5 in the axial direction and the circumferential direction can sufficiently be secured, and an excellent anti-rotation torque can be obtained.

The flange 52 of the outer shaft 5 is disposed at a position opposed to the thick portion 42 of the inner shaft 4 in the radial direction. The rigidity of the flange 52 is higher than that of a portion of the outer shaft 5 where the flange 52 does not exist. The rigidity of the thick portion 42 is higher than that of other portion of the inner shaft 4 in the radial direction. That is, in this embodiment, the flange 52 having the high rigidity is disposed outside of the thick portion 42 having the high rigidity. Therefore, the fastening strength between the inner shaft 4 and the outer shaft 5 in the axial direction and the circumferential direction can be enhanced, and the anti-rotation torque can further be enhanced.

Figure 6:
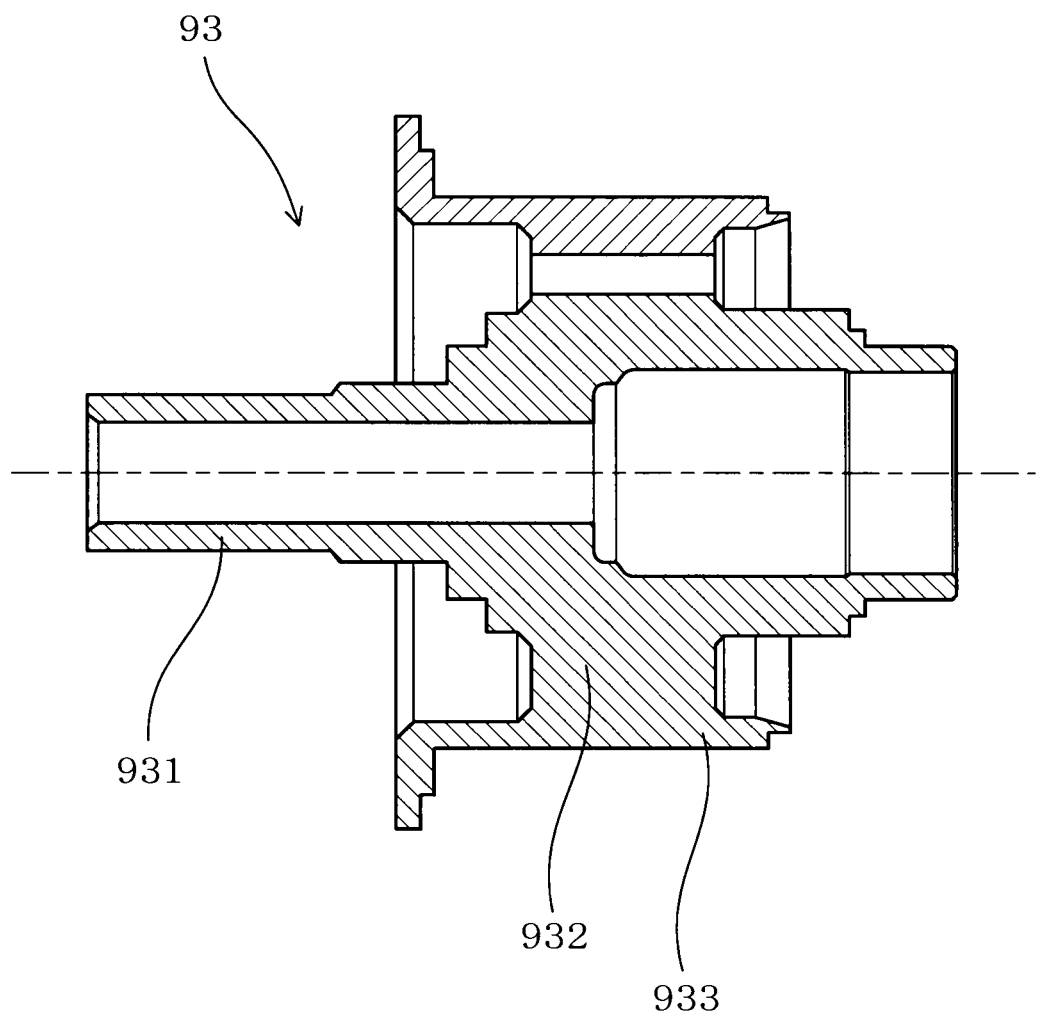
FIG. 6 is an explanatory diagram showing a rotor shaft of a conventional example.

By disposing the flange 52 having the high rigidity outside of the thick portion 42 having the high rigidity, even if the length of the flange 52 in the axial direction is shortened and its weight is reduced as compared with the conventional technique (see FIG. 6), the fastening strength between the inner shaft 4 and the outer shaft 5 and the anti-rotation torque can sufficiently be secured, and the weight of the entire rotor shaft 3 can be reduced.

In this embodiment, a region of the flange 52 not less than 85% of the length L thereof in length in the axial direction is opposed to the thick portion 42 in the radial direction. Therefore, it is possible to sufficiently exhibit the effect for enhancing the fastening strength between the inner shaft 4 and the outer shaft 5 by opposing the flange 52 and the thick portion 42 to each other.

The inner shaft 4 is shrink-fitted into the inserting hole 50 of the inner cylindrical portion 51 of the outer shaft 5. Therefore, the inner shaft 4 and the outer shaft 5 can easily be fastened to each other. According to the configuration of the embodiment, even when the inner shaft 4 and the outer shaft 5 are fastened to each other by the shrink-fitting, the fastening strength therebetween can sufficiently be secured.

The asperities are formed on the contact surface 422a of the outer peripheral surface 422 of the thick portion 42 with respect to the inner peripheral surface 501 of the inserting hole 50 of the inner cylindrical portion 51. More specifically, the asperities are formed on the portion of the contact surface 422a of the outer peripheral surface 422 of the thick portion 42 that is opposed to the thick portion 42 and the flange 52 in the radial direction. For this reason, the inner peripheral surface 501 of the inserting hole 50 of the inner cylindrical portion 51 of the outer shaft 5 comes into contact with and bites into the asperities of the outer peripheral surface 420 of the thick portion 42 of the inner shaft 4, whereby the fastening strength between the inner shaft 4 and the outer shaft 5 can further be enhanced.

Especially, in the portion where the flange 52 is disposed outside of the thick portion 42 having the high rigidity, the above effect is obtained, that is, the fastening strength can be enhanced more effectively.

In this embodiment, since the inner shaft 4 and the outer shaft 5 are fastened to each other by the shrink-fitting, the above effect can further be exhibited. Since the height of the asperities of the contact surface 422a is half or less of the shrink-fitting margin, the fastening strength can be enhanced reliably.

The inner shaft 4 is made of SCr415 that is subjected to the carburizing processing, and the outer shaft 5 is made of S50C that is the carbon steel for machine structure. By selecting the materials of the inner shaft 4 and the outer shaft 5 as described above, it is possible to further exhibit the effect that the fastening strength between the inner shaft 4 and the outer shaft 5 can sufficiently be secured, and the excellent anti-rotation torque can be obtained.

According to the rotor shaft 3 of the embodiment, it is possible to sufficiently secure the fastening strength between the inner shaft 4 and the outer shaft 5, to obtain the excellent anti-rotation torque, and to reduce the weight of the rotor shaft.

Second Embodiment

In the second embodiment, the anti-rotation torque of the rotor shaft when the dividing position between the inner shaft and the outer shaft is changed is evaluated.

In this embodiment, as shown in FIGS. 3A to 3D, rotor shafts 3 (samples 11 to 14) having different dividing positions between the inner shaft 4 and the outer shaft 5 were prepared, and anti-rotation torques when shrink-fitting margins A and B (A<B) were set were measured.

Figure 3A:
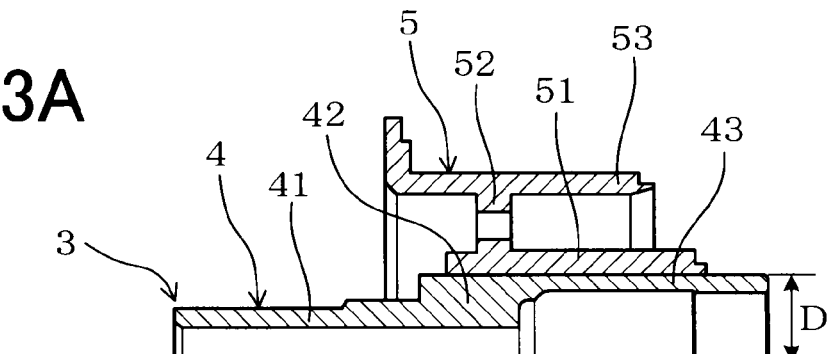
FIGS. 3A to 3D are explanatory diagrams showing the rotor shaft in which a dividing position is changed.

More specifically, the sample 11 is the same rotor shaft 3 as that of the first embodiment as shown in FIG. 3A.

Figure 3B:
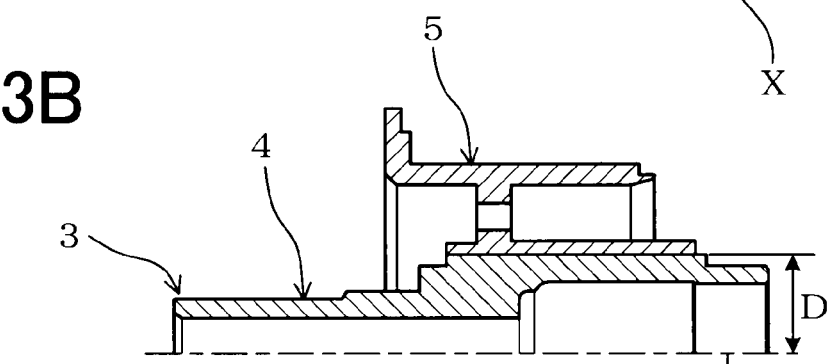
Figure 3C:
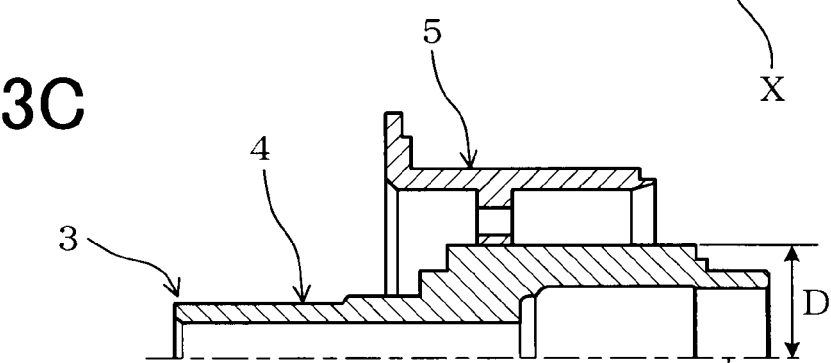
Figure 3D:
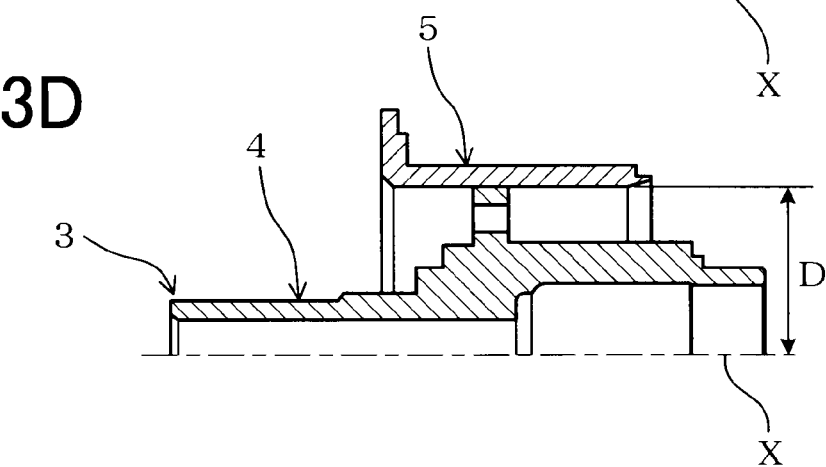

The dividing positions of other rotor shafts 3 will be described using a constituting portion (see FIG. 3A) of the rotor shaft 3 of the sample 11. In the sample 12, the dividing position thereof is at an intermediate position of the inner cylindrical portion 51 of the outer shaft 5 as shown in FIG. 3B. The dividing position of the sample 13 is between the inner cylindrical portion 51 and the flange 52 of the outer shaft 5 as shown in FIG. 3C. The dividing position of the sample 14 is between the flange 52 and the magnetic body-mounting outer cylindrical portion 53 of the outer shaft 5 as shown in FIG. 3D.

The anti-rotation torque was obtained by calculation. A friction coefficient between the inner shaft 4 and the outer shaft 5 is about 0.2.

Figure 4:
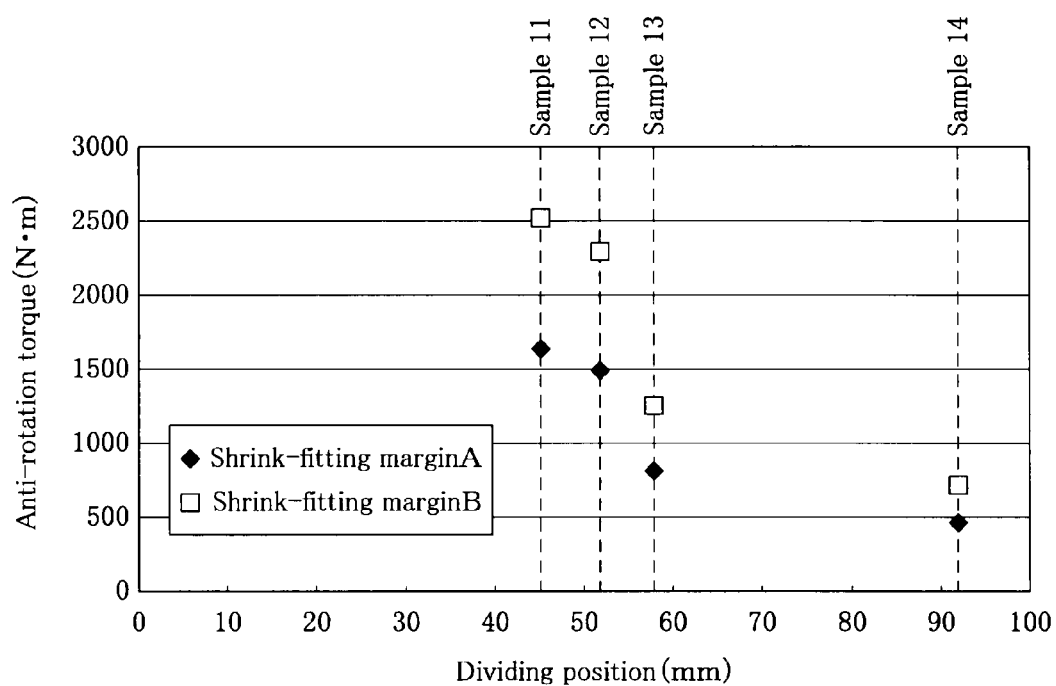
FIG. 4 is a graph showing a relation between the dividing position and an anti-rotation torque in a second embodiment.

A result of measurement is shown in Table 1 and FIG. 4. In FIG. 4, a vertical axis shows the anti-rotation torque (N·m), and a lateral axis shows the dividing position (mm). The dividing position is a position separated from the center X of the rotor shaft 3 by the distance D as shown in FIGS. 3A to 3D.

TABLE 1

| Sample | dividing position (mm) | anti-rotation torque(N·m) | |
|---|---|---|---|
| | | shrink-fitting margin A | shrink-fitting margin B |
| 11 | 45.25 | 1634 | 2518 |
| 12 | 52 | 1485 | 2288 |
| 13 | 58 | 808 | 1245 |
| 14 | 92 | 455 | 701 |

From Table 1 and FIG. 4, the sample 11 that is a product of the present invention has a high anti-rotation torque as compared with the samples 12 to 13 in which the inner shaft 4 and the outer shaft 5 are divided at other positions. That is, in the product of the invention, the length of the fastened portion between the inner shaft 4 and the outer shaft 5 in the axial direction (an area of the entire fastened portion) can sufficiently be secured. Therefore, it can be found that the fastening strength therebetween can sufficiently be secured and the excellent anti-rotation torque can be obtained.

Third Embodiment

In the third embodiment, the anti-rotation torque of the rotor shaft when the position of the flange of the outer shaft is changed is evaluated.

In this embodiment, as shown in FIGS. 5A to 5D, rotor shafts 3 (samples 21 to 24) having the flange 52 of the outer shaft 5 in different positions (lengths L in the axial direction) of were prepared, and the anti-rotation torque when the predetermined shrink-fitting margins A and B (A<B) were set in the same manner as in the second embodiment were measured.

Figure 5A:
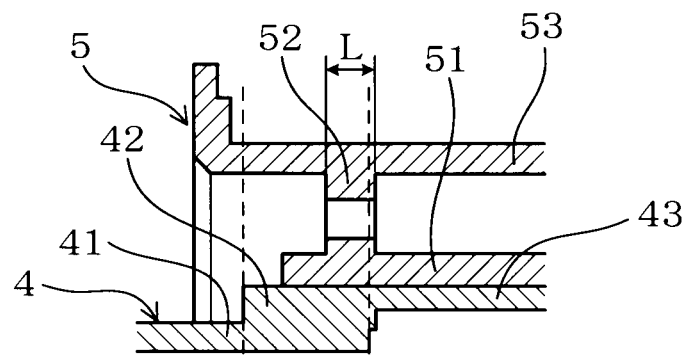
FIGS. 5A to 5D are explanatory diagrams showing the rotor shaft in which a position of a flange is changed in a third embodiment.
Figure 5B:
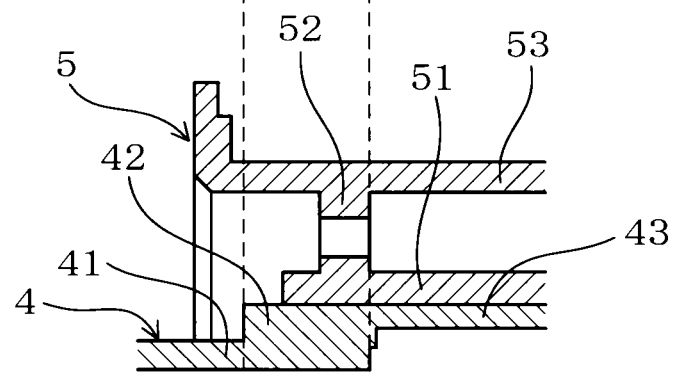
Figure 5C:
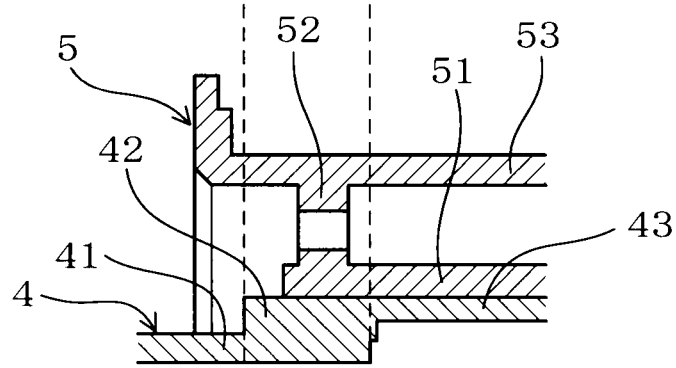
Figure 5D:
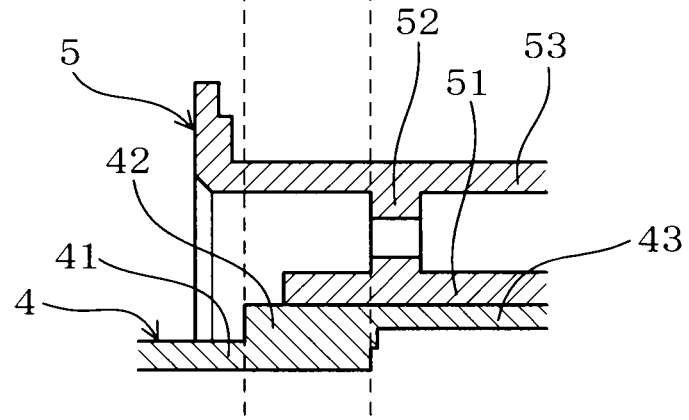

More specifically, the sample 21 is the same rotor shaft 3 as that of the first embodiment, as shown in FIG. 5A. In the sample 22, the position of the flange 52 is moved toward the tip end portion by 1.7 mm more than in the sample 21, as shown in FIG. 5B. In the sample 23, the position of the flange 52 is moved toward the tip end portion by 8 mm more than in the sample 21, as shown in FIG. 5C. In the sample 24, the position of the flange 52 is moved toward the rear end portion by 12.3 mm more than in the sample 21, as shown in FIG. 5D.

The anti-rotation torque was measured by the same method as that of the second embodiment. The friction coefficient between the inner shaft 4 and the outer shaft 5 is about 0.2.

A result of measurement is shown in Table 2.

TABLE 2

| Sample | dividing position (mm) | anti-rotation torque(N·m) | |
|---|---|---|---|
| | | shrink-fitting margin A | shrink-fitting margin B |
| 21 | 45.25 | 1634 | 2518 |
| 22 | | 1659 | 2557 |
| 23 | | 1651 | 2545 |
| 24 | | 1424 | 2195 |

As is clear from Table 2, a sufficient anti-rotation torque is secured in each of the samples 21 to 23 in which the flange 52 is opposed to the thick portion 42 in the radial direction and its region is sufficient. On the other hand, in the sample 24 in which most of region of the flange 52 is not opposed to the thick portion 42 in the radial direction, the fastening strength is lower than those of the other samples.

It can be found from this that if the flange 52 is disposed outside of the thick portion 42 having the high rigidity and the opposing region between the flange 52 and the thick portion 42 is sufficient, it is possible to enhance the fastening strength between the inner shaft 4 and the outer shaft 5, and to further enhance the anti-rotation torque.

What is claimed is:

1. A rotor shaft used for a rotor of a dynamo-electric machine, wherein
the rotor shaft is configured to be divided into a cylindrical inner shaft and an outer shaft disposed on an outer periphery of the inner shaft,
the inner shaft includes a tip end portion that is an end on a side where a rotation load is input to the rotor shaft, a rear end portion having an outer diameter and an inner diameter greater than respective outer diameter and inner diameter of the tip end portion, and a thick portion that connects the tip end portion and the rear end portion with each other and that has the same inner diameter as that of the tip end portion and has the same outer diameter as that of the rear end,
the outer shaft includes an inner cylindrical portion having an inserting hole into which the inner shaft is inserted and fitted, a magnetic body-mounting outer cylindrical portion that is disposed on an outer peripheral side portion of the inner cylindrical portion and that mounts a magnetic body to form a magnetic circuit, and a flange that is formed radially outward from an outer periphery of the inner cylindrical portion and that connects the inner cylindrical portion and the magnetic body-mounting outer cylindrical portion with each other,
the inner shaft and the outer shaft are fastened and fixed to each other by mutual pressing forces in a state that the outer peripheral surfaces of the thick portion and the rear end portion and an inner peripheral surface of the inserting hole of the inner cylindrical portion are brought into contact with each other, and the flange of the outer shaft is disposed at a position opposed to the thick portion of the inner shaft in a radial direction thereof.

2. The rotor shaft according to claim 1, wherein 85% or more of the flange in length in its axial direction is opposed to the thick portion in the radial direction.

3. The rotor shaft according to claim 1, wherein the inner shaft is shrink-fitted into the inserting hole of the inner cylindrical portion of the outer shaft.

4. The rotor shaft according to claim 1, wherein asperities are formed on at least a portion of a contact surface of the outer peripheral surface of the thick portion with respect to the inner peripheral surface of the inserting hole of the inner cylindrical portion.

5. The rotor shaft according to claim 4, wherein the asperities are formed on at least a part of the contact surface of the outer peripheral surface of the thick portion where the thick portion and the flange are opposed to each other in the radial direction.

6. The rotor shaft according to claim 1, wherein the inner shaft is made of material that is subjected to carburizing processing or carbonitriding processing, and the outer shaft is made of carbon steel for machine structure or chromium steel.

7. The rotor shaft according to claim 1, wherein a wall thickness of the thick portion in the radial direction is greater than each of a wall thickness of the tip end portion in the radial direction and a wall thickness of the rear end portion in the radial direction.

* * * * *